Aug. 14, 1945.  C. A. DE GIERS  2,382,695
TANK CONTENTS GAUGE WITH CORRECTION FOR TEMPERATURE
Filed Nov. 27, 1941
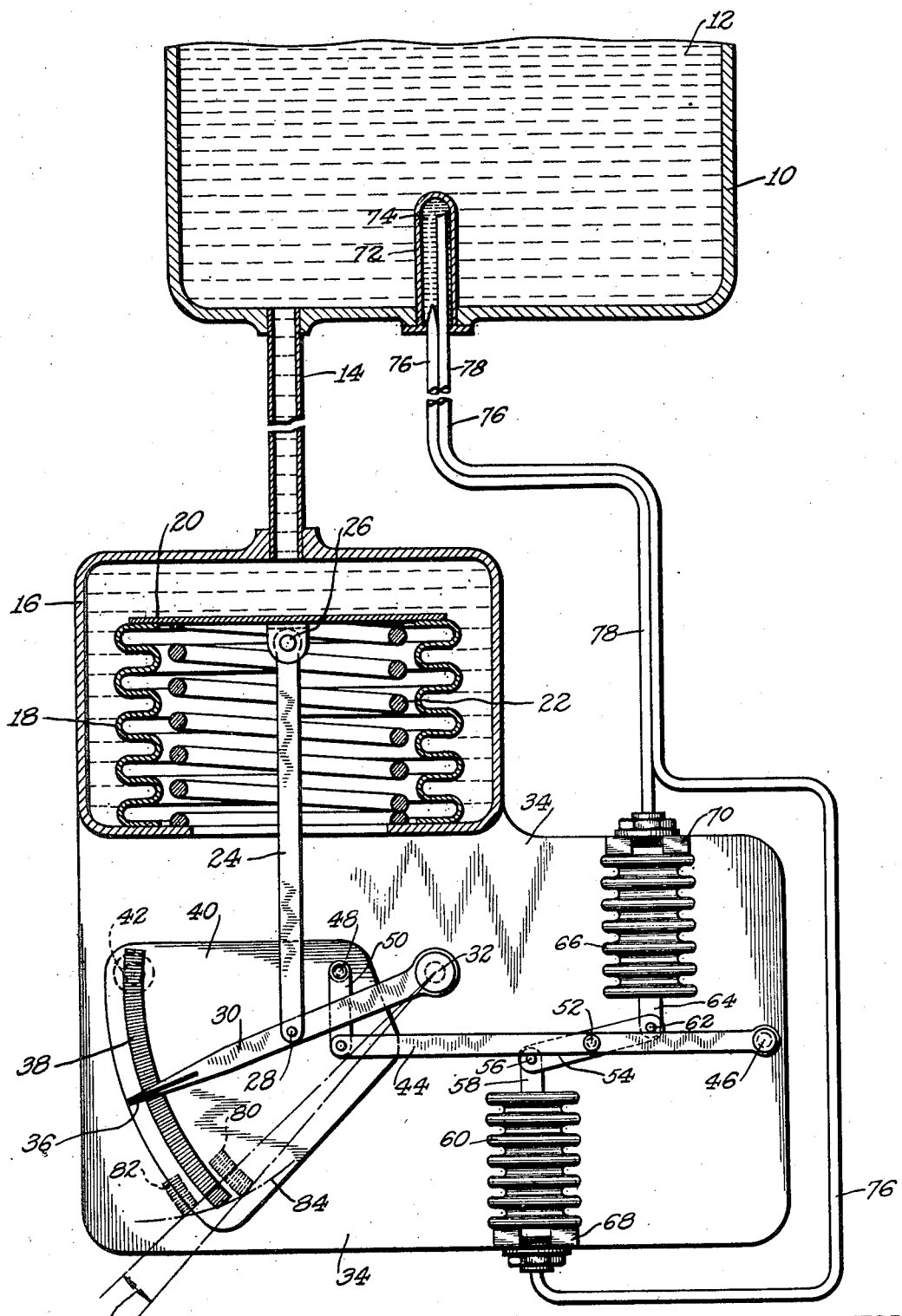
INVENTOR
Clarence A. de Giers
BY Cooper, Kerr & Dunham
ATTORNEYS Patented Aug. 14, 1945

2,382,695

UNITED STATES PATENT OFFICE 2,382,695

TANK CONTENTS GAUGE WITH CORRECTION FOR TEMPERATURE

Clarence A. de Giers, Forest Hills, N. Y., assignor to The Liquidometer Corporation, Long Island City, N. Y., a corporation of Delaware Application November 27, 1941, Serial No. 420,666

3 Claims. (Cl. 73—299)

This invention discloses means for giving correct volumetric indications of the liquid contents of a tank by a static-head type of gauge even though the liquid in the tank is subjected to changes of temperature.

Tank contents gauges controlled by floats resting on the surface of the liquid may give correct indications of volume regardless of temperature changes, but that is not true with static-head gauges since the pressure due to a given column of liquid does not change with change of temperature of the column.

Under certain conditions it is desirable to have correct indications in terms of volume even though, due to special conditions, the static-head principle must be used instead of float control, and an object of the present invention is to provide temperature compensating means enabling static type gauges to give correct volume indication regardless of wide changes of temperatures such as are encountered, for instance, in airplanes.

The tanks of an airplane standing at ground level, on a hot day, may be filled with fuel measured in gallons and pumped from comparatively cool underground tanks. Under such conditions there is a discrepancy in the records as soon as the fuel attains ground level temperature unless the gauges in the airplane are able to give correct indications of volume regardless of temperature. Again, when the airplane leaves the hot landing field and climbs to a high altitude, its temperature may go down to zero or below and again a discrepancy appears, but in the other direction.

If static-head contents gauges gave indications in terms of weight they would be as correct at one temperature as at another, but since trade custom requires indications in gallons (volume) and not in pounds (weight), there is need for the present invention.

The drawing shows one embodiment of the invention, largely in diagrammatic form.

Tank 10 contains liquid 12 and is connected by a pipe 14 to a chamber 16 containing a bellows 18 having a head 20. Within the bellows, as indicated, is a compression spring 22. A vertical link 24, attached to head 20 at 26 extends downwardly through the open lower ends of bellows 18 and chamber 16, and is connected at 28 to an arm 30, pivoted at 32 on a plate 34 which supports chamber 16 and other parts of the device.

The free end 36 of arm 30 is illustrated as a shoe passing over a suitably calibrated resistance strip 38, but under certain conditions 36 may be simply a pointer, and 38 may be simply a graduated chart. The arrangement is used when it may be desirable to electrically control a remote indicator. Spring 22 is depressed more or less, and pointer 36 moves accordingly, depending on the weight of liquid on head 20.

Were it not for temperature changes the mechanism already described would give correct indications. The temperature compensating device will now be described.

Chart 38 is fixedly mounted on a plate 40, pivoted on plate 34 at 42. When tank 10 is empty the end 36 of arm 30 is at 42 which is the zero point of the chart. When the tank contains liquid temperature compensation is obtained by automatically swinging plate 40 and chart 38 attached thereto, about point 42 in order to require pointer 36 to travel a greater or less distance to reach any certain point on the chart depending on whether the temperature goes up or down.

Movement of plate 40 is controlled by a lever 44 fulcrumed on plate 34 at 46 and connected to plate 40 at 48 by a link 50. Lever 44 is actuated by pin 52 in floating link 54, the link being pivotally connected at 56 to a stud 58 attached to bellows 60, and at 62 to stud 64 attached to bellows 66. The lower end of bellows 60 and upper end of bellows 66 are fixedly attached to plate 34 at 68 and 70 respectively.

In tank 10 is a thermometer bulb 72 containing liquid 74. Bellows 66 is connected to bulb 72 by a tube 78 having an end open to liquid 74. Bellows 60 is connected to the bulb by a tube 76 having its bulb end closed.

As disclosed in my patent No. 1,943,267, issued January 9, 1934, the above described arrangement comprising a pair of similar bellows, inter-connected by a floating link 54, which in turn is connected at its mid-point to another member such as lever 44, will cause no movement of lever 44 if the bellows and pipes 76 and 78 are subjected to a change of temperature, but will, on the other hand, cause a movement of lever 44 if the temperature of liquid 74 in the thermometer bulb should change.

When the thermometer temperature rises, liquid 74 will expand causing bellows 66 to expand lengthwise, lever 44 will be forced downwardly by pin 52, and plate 40 will be moved clockwise about its pivot 42, through an arc depending on the amount of temperature change, thus moving the lower end of chart 38 to the dotted line position 82. If the thermometer temperature drops, bellows 66 will contract and plate 40 will be rotated counterclockwise to move chart 38 to dotted line position 80.

The outer end of chart 38 swings on arc 84 about center 42 and it will be seen from the drawing that, so far as pointer 36 is concerned, between the high temperature and low temperature positions of the drawing, chart 38 has increased in length by an amount indicated by the arc 86.

In other words, when the temperature of liquid contents 12 rises or falls and its volume increases or decreases, pointer 36 must travel further or not so far to reach any given indication on the chart, the change in travel being proportional to the change in volume due to the higher or lower temperature, thus always giving correct volumetric indications regardless of temperature changes.

It is to be understood that the invention is not limited to the specific embodiment herein illustrated and described, but may be used in other ways without departure from its spirit as defined by the following claims.

What is claimed is:

1. A tank contents gauge comprising in combination, an indicator comprising a pivoted pointer and means for causing said pointer to be solely responsive to change of static-head of liquid in the tank, said indicator having a pivotally mounted chart, and means responsive to change of temperature of said liquid for swinging said chart about its pivot in order to change the effective length of said chart, the pivot of said chart being spaced from the pivot of said pointer.

2. A tank contents gauge comprising in combination, an indicator and means for causing said indicator to be responsive to change of static-head of liquid in the tank, said indicator having a chart with a zero indication, said chart having a pivotal support at said zero indication, and means responsive to change of temperature of said liquid for swinging said chart about its pivotal support in order to change the effective length of said chart.

3. A gauge for indicating the volumetric contents of a tank at varying temperatures, comprising means responsive to the hydrostatic head of liquid in the tank, an indicating means operated by the first named means to move in a predetermined path including a position indicative of a zero content of liquid in the tank, a chart associated with said indicating means, means for supporting said chart and permitting its movement only in a way such that the zero point on the chart may not move in any direction having even a component along the path of movement of said indicating means, and means for moving and positioning said chart in response to the temperature of liquid in said tank.

CLARENCE A. DE GIERS.